United States Patent
Lee et al.

(10) Patent No.: US 6,841,087 B2
(45) Date of Patent: Jan. 11, 2005

(54) REFRIGERANT COMPOSITION COMPRISING DIFLUOROMETHANE, 1,1,1-TRIFLUOROETHANE AND 1,1,1,2-TETRAFLUOROETHANE

(75) Inventors: Byung-Gwon Lee, Seoul (KR); Jong-Sung Lim, Seoul (KR); Byoung Sung Ahn, Seoul (KR); Kun You Park, Seoul (KR); Chang-Nyeon Kim, Seoul (KR)

(73) Assignee: Korea Institute of Science and Technology (KR)

( * ) Notice: Subject to any disclaimer, the term of this patent is extended or adjusted under 35 U.S.C. 154(b) by 144 days.

(21) Appl. No.: 10/127,217

(22) Filed: Apr. 19, 2002

(65) Prior Publication Data

US 2003/0197149 A1 Oct. 23, 2003

(51) Int. Cl.⁷ .................................. C09K 5/04
(52) U.S. Cl. ........................................ 252/67
(58) Field of Search ....................... 252/67, 68

(56) References Cited

U.S. PATENT DOCUMENTS

| | | | |
|---|---|---|---|
| 5,080,823 A | 1/1992 | Arnaud et al. | |
| 5,211,867 A | 5/1993 | Shankland et al. | |
| 5,234,613 A | 8/1993 | Shiflett | |
| 5,236,611 A | 8/1993 | Shiflett | |
| 5,290,466 A | 3/1994 | Shiflett | |
| 5,340,490 A | 8/1994 | Decaire et al. | |
| 5,403,504 A | 4/1995 | Bivens et al. | |
| 5,429,740 A | 7/1995 | Van Der Herberg | |
| 5,538,660 A | 7/1996 | Macaudiere | |

FOREIGN PATENT DOCUMENTS

| | | |
|---|---|---|
| JP | 03170583 | 7/1991 |
| JP | 03170584 | 7/1991 |
| JP | 03170585 | 7/1991 |
| JP | 03170588 | 7/1991 |
| JP | 03170589 | 7/1991 |
| JP | 03170590 | 7/1991 |
| JP | 03170591 | 7/1991 |
| JP | 03170593 | 7/1991 |
| JP | 03170594 | 7/1991 |
| JP | 03172384 | 7/1991 |
| JP | 03172386 | 7/1991 |
| JP | 04154887 | 5/1992 |
| JP | 04222893 | 8/1992 |
| JP | 05117643 | 5/1993 |
| JP | 05117645 | 5/1993 |
| JP | 06065561 | 3/1994 |
| JP | 06128872 | 5/1994 |
| JP | 07173462 | 7/1995 |
| JP | 08127767 | 5/1996 |
| JP | 176537 | 7/1996 |
| JP | 09025480 | 1/1997 |
| JP | 09208941 | 8/1997 |
| JP | 09221664 | 8/1997 |
| KR | 0004485 | 2/1996 |
| WO | WO 97/15637 * | 5/1997 |

* cited by examiner

Primary Examiner—John R. Hardee
(74) Attorney, Agent, or Firm—Ostrolenk, Faber, Gerb & Soffen, LLP

(57) ABSTRACT

A refrigerant composition that can be a substitute for chlorodifluoromethane (HCFC-22) comprises: (a) a first constituent of difluoromethane, (b) a second constituent of 1,1,1-trifluoroethane, (c) a third constituent of 1,1,1,2-tetrafluoroethane, and (d) a fourth constituent selected from the group consisting of 1,1-difluoroethane, 1,1,1,2,3,3,3-heptafluoropropane, 1,1,1,2,3,3-hexafluropropane and butane.

5 Claims, No Drawings

REFRIGERANT COMPOSITION COMPRISING DIFLUOROMETHANE, 1,1,1-TRIFLUOROETHANE AND 1,1,1,2-TETRAFLUOROETHANE

BACKGROUND OF THE INVENTION

1. Field of the Invention

The present invention relates to a refrigerant composition that can replace chlorodifluoromethane (referred to as 'HCFC-22', hereinafter) which has been known to destroy the ozone layer of the Earth.

2. Description of the Background Art

Since chlorofluorocarbon (referred to as 'CFC', hereinafter) compounds were revealed as substances destroying the ozone layer of the Earth, they have been restricted in production and use according to the Montreal Protocol. In developed countries, the use of CFC compounds has already been banned since 1996. Not so much serious as CFC compounds, but HCFC compounds such as HCFC-22 have also known to have considerable effects in causing damages to the ozone layer. For this reason, a restriction has been made to gradually reduce the use of HCFC compounds, and a plan has also been made to ban its use around 2030.

Many researches are being conducted to develop a substitute material for HCFC-22. Representative substitute materials for HCFC-22 are HFC-407C and HFC-410A proposed by the American Society of Heating, Refrigerating and Air-conditioning Engineers (ASHRAE). HFC-407C is a refrigerant composition of HFC-32/125/134a in a ratio of 23/25/52 based on weight percent. Meanwhile, HFC-410A is a refrigerant composition of HFC-32/125 in a ratio of 50/50 based on weight percent.

In addition, U.S. Pat. No. 5,080,823 discloses a refrigerant composition of HFC-143a/propane, U.S. Pat. No. 5,211,867: HFC-125/143a, U.S. Pat. No. 5,234,613: HFC-32/propane, U.S. Pat. No. 5,236,611 of PFC-218/HFC-143a, U.S. Pat. No. 5,290,466: HFC-32/134a/134, U.S. Pat. No. 5,340,490: HFC-23/CO$_2$ and HFC-23/116/CO$_2$, U.S. Pat. No. 5,403,504: HFC-125/32, U.S. Pat. No. 5,429,740: HFC-23/134a U.S. Pat. No. 5,538,660: HFC-32/HFC-134a/FC-41 and HFC-32/HFC-134a/PFC-218, and U.S. Pat. No. 5,643,492: HFC-32/125/134a.

Also, Japanese Patent Laid-open Publication No. 172386/1991 discloses a refrigerant composition of HFC-32/125/143a, Japanese Patent Laid-open Publication No. 170594/1991: HFC-23/125/134a, Japanese Patent Laid-open Publication No. 170593/1991: HFC-23/143a/134a, Japanese Patent Laid-open Publication No. 170591/1991: HFC-23/143a/134a, Japanese Patent Laid-open Publication No. 170590/1991: HFC-125/134a/32, Japanese Patent Laid-open Publication No. 170589/1991: HFC-23/143a/152a, Japanese Patent Laid-open Publication No. 170588/1991: HFC-125/143a/134a, Japanese Patent Laid-open Publication No. 170585/1991: HFC-32!125/134a, Japanese Patent Laid-open Publication No. 170584/1991: HFC-23/134a/152a, Japanese Patent Laid-open Publication No. 170583/1991: HFC-125/143a/32, Japanese Patent Laid-open Publication No. 222893/1992: HFC-32/125, Japanese Patent Laid-open Publication No. 154887/1992: HFC-134/152a, Japanese Patent Laid-open Publication No. 117645/1993: HFC-23/134a/propane, Japanese Patent Laid-open Publication No. 117643/1993: HFC-125/134a/propane, Japanese Patent Laid-open Publication No. 65561/1994: HFC-23/152a/PFC-218, Japanese Patent Laid-open Publication No. 128872/1994: HFC-32/PFC-218, Japanese Patent Laid-open Publication No. 173462/1995: HFC-32/125-RC-318, Japanese Patent Laid-open Publication No. 173462/1995: HFC-143a/125/134a/heptane, Japanese Patent Laid-open Publication No. 176537/1996: PFC-218/RC-270/HFC-152a, Japanese Patent Laid-open Publication No. 151569/1996: propane/RC-270/HFC-134a, Japanese Patent Laid-open Publication No. 127767/1996: HFC-32/134a/RC-318, Japanese Patent Laid-open Publication No. 25480/1997: HFC-32/134a/125/isobutane, Japanese Patent Laid-open Publication No. 208941/1997: HFC-32/152a/125/RC-270, and Japanese Patent Laid-open Publication No. 221664/1997: HFC-125/143a/134a/RC-270.

Also, Korean Patent Laid-open Publication No. 91-9902 discloses a refrigerant composition of HFC-23/32/152a, HFC-23/125/152a, HFC-32/143a/152a, HFC-32/125/125a, HFC-23/143a/152a, Korean Patent Laid-open Publication No. 91-9903: HFC-23/32/134, HFC-23/32/134a, HFC-23/125/134, HFC-32/125/134, HFC-23/143a/134a, HFC-125/143a/134a, HFC-125/143a/134, Korean Patent Laid-open Publication No. 96-4485: HFC-32/23/134a, Korean Patent Laid-open Publication No. 96-701168: HFC-227ea/HFC-152a, Korean Patent Laid-open Publication No. 97-704853: HFC-134a/HCFC-124/butane.

SUMMARY OF THE INVENTION

Therefore, an object of the present invention is to provide a novel refrigerant composition that can be used as a substitute for HCFC-22, without containing a substance that destroys the ozone layer of the Earth.

DETAILED DESCRIPTION OF THE INVENTION

The above and other objects of the present invention, as embodied and broadly described herein, are achieved by providing a refrigerant composition, comprising (a) a first constituent of difluoromethane (hereinafter referred to as 'HFC-32'), (b) a second constituent of 1,1,1-trifluoroethane (hereinafter referred to as 'HFC-143a'), (c) a third constituent of 1,1,1,2-tetrafluoroethane (hereinafter referred to as 'HFC-134a') and (d) a fourth constituent selected from the group consisting of 1,1-difluoroethane (hereinafter referred to as 'HFC-152a'), 1,1,1,2,3,3,3-heptafluoropropane (hereinafter referred to as 'HFC-227ea'), 1,1,1,2,3,3-hexafluropropane (hereinafter referred to as 'HFC-236ea') and butane (hereinafter referred to as 'R-600').

Advantageously, the refrigerant composition of the present invention does not have any risk to damage the ozone layer, and therefore, there is no concern to be restricted in its use in the future. The above compounds that can be a constituent of the refrigerant composition of the present invention have already been produced, or research is actively conducted to produce them for later use. Their use is newly added through the present invention, and therefore they can be used more effectively.

The refrigerant composition of the present invention has been applied for a refrigeration system having a compressor, a condenser, an expansion valve and an evaporator to evaluate a coefficient of performance (COP), a volumetric capacity (VC) of the refrigerant and pressures in the compressor and evaporator. The novel refrigerant composition proposed by the present invention has been evaluated to have almost the same level in performance compared with that of HFC-407C or HFC-410 that has been proposed as a substitute refrigerant for HFC-22, so that it can be used as a substitute for HFC-22.

It is preferred that the refrigerant composition of the present invention comprises the first constituent in the range of 20–70 wt. %, the second and third constituents in the ranges of 10–50 wt. %, respectively, and the fourth constituent in the range of 5–40 wt. %. Preferred embodiments of the refrigerant composition of the present invention comprising specific compounds will now be described.

Where the refrigerant composition comprising HFC-32, HFC-143a, HFC-134a and HFC-152a, the contents of constituents are in the ranges of 20–70 wt. %, 10–50 wt. %, 10–50 wt. % and 10–40 wt. %, respectively, and preferably, in the ranges of 30–60 wt. %, 20–40 wt. %, 20–40 wt. % and 20–30 wt. %, respectively.

Where the refrigerant composition comprising HFC-32, HFC-143a, HFC-134a and HFC-227ea, the contents of constituents are in the ranges of of 30–70 wt. %, 10–50-wt. % 10–50 wt. % and 10–30 wt. %, respectively, and preferably, in the ranges of 20–60 wt. %, 20–40 wt. %, 20–40 wt. % and 15–25 wt. %, respectively.

Where the refrigerant composition comprising HFC-32, HFC-143a, HFC-134a and HFC-236ea, the contents of constituents are in the ranges of 40–70 wt. %, 10–40 wt. %, 10–40 wt. % and 5–15 wt. %, respectively, and preferably, in the ranges of 50–60 wt. %, 20–30 wt. %, 20–30 wt. % and 8–12 wt. %, respectively.

Where the refrigerant composition comprising HFC-32, HFC-143a, HFC-134a and R-600, the contents of constituents are in the ranges of 40–70 wt. %, 10–40 wt. %, 10–40 wt. % and 5–13 wt. %, respectively, and preferably, in the ranges of 50–60 wt. %, 20–30 wt. %, 20–30 wt. % and 7–10 wt. %, respectively.

EXAMPLES

The present invention will now be explained in more detail with the comparative examples and examples evaluating the performance of the refrigerant compositions. It is to be understood that these examples are merely illustrative and not intended to limit the scope of the present invention thereto.

By using a refrigeration system having a compressor, a condenser, an expansion valve and an evaporator, main factors for evaluating refrigerant performance including a coefficient of performance (COP), a volumetric capacity (VC) of the refrigerant, pressure in the evaporator ($P_L$) and pressure in the condenser ($P_H$) were measured for HCFC-22, HFC-407C and HFC-410A (Comparative Examples 1 to 3), and the refrigerant compositions of the present invention (Examples 1 to 4 under the following conditions:
Refrigeration capacity: 2 kW
Overall Heat Transfer Coefficient in Evaporator (UA): 0.20 kW/K
Overall Heat Transfer Coefficient in Condenser (UA): 0.24 kW/K
Degree of Subcooling in Condenser: 5° C.
Degree of Superheating in Evaporator: 5° C.
Efficiency of Compressor: 0.8
Temperature of Secondary Fluid at Inlet of Condenser: 25° C.
Temperature of Secondary Fluid at Outlet of Condenser: 35° C.
Temperature of Secondary Fluid at Inlet of Evaporator: 15° C.
Temperature of Secondary Fluid at Outlet of Evaporator: 5° C.

Comparative Examples 1–3

Performance was evaluated for HCFC-22, HFC-407C and HFC-410A under the above-described conditions, of which results are as shown in Table 1.

TABLE 1

| Comparative Example No. | Refrigerant | HFC-22 (wt. %) | HFC-32 (wt. %) | HFC-125 (wt. %) | HFC-134a (wt. %) | COP | VC (kJ/m³) | $P_L$ (kPa) | $P_H$ (kPa) |
|---|---|---|---|---|---|---|---|---|---|
| 1 | HCFC-22 | 100 | — | — | — | 5.45 | 3338 | 455 | 1254 |
| 2 | HFC-407C | — | 23 | 25 | 52 | 4.98 | 3412 | 460 | 1445 |
| 3 | HFC-410A | — | 50 | 50 | — | 5.31 | 5117 | 730 | 1993 |

It is noted in Table 1 that HFC-407C has a lower COP compared with HCFC-22 while having almost the same VC and pressures. Compared with HCFC-22, HFC-410A has a similar COP and a higher VC, while having a little higher pressures. As far as the performance of a refrigerant comes within the ranges as described above, the refrigerant has been evaluated to be used as a substitute refrigerant for HCFC-22. Accordingly, in the following examples, performance of the refrigerant compositions according to the present invention was evaluated and compared with those of the refrigerant compositions of comparative examples.

Example 1

Performances of the refrigerant compositions comprising HFC-32/HFC-143a/HFC-134a/HFC-152a having various mixed ratios were evaluated, and the results are as shown in Table 2.

TABLE 2

| Composition | HFC-32 (wt. %) | HFC-143a (wt. %) | HFC-134a (wt. %) | HFC-152a (wt. %) | COP | VC (kJ/m³) | $P_L$ (kPa) | $P_H$ (kPa) |
|---|---|---|---|---|---|---|---|---|
| 1 | 30 | 40 | 20 | 20 | 5.05 | 3375.8 | 462.1 | 1398.7 |
| 2 | 30 | 20 | 20 | 30 | 5.13 | 3365.6 | 443.9 | 1359.0 |
| 3 | 30 | 10 | 50 | 10 | 5.14 | 3387.1 | 444.5 | 1373.1 |
| 4 | 30 | 20 | 40 | 10 | 5.12 | 3534.4 | 472.8 | 1436.7 |
| 5 | 30 | 40 | 20 | 10 | 5.10 | 3834.3 | 532.8 | 1563.2 |
| 6 | 60 | 10 | 10 | 20 | 5.23 | 4206.8 | 561.3 | 1631.8 |
| 7 | 60 | 20 | 10 | 10 | 5.29 | 4518.6 | 617.3 | 1739.2 |
| 8 | 40 | 30 | 10 | 20 | 5.15 | 3904 | 531.3 | 1561.5 |
| 9 | 40 | 10 | 10 | 40 | 5.14 | 3430.7 | 445.8 | 1369.8 |
| 10 | 40 | 10 | 30 | 20 | 5.18 | 3637.0 | 477.8 | 1445.7 |

TABLE 2-continued

| Composition | HFC-32 (wt. %) | HFC-143a (wt. %) | HFC-134a (wt. %) | HFC-152a (wt. %) | COP | VC (kJ/m$^3$) | P$_L$ (kPa) | P$_H$ (kPa) |
|---|---|---|---|---|---|---|---|---|
| 11 | 50 | 10 | 30 | 10 | 5.22 | 4046.9 | 539.2 | 1586.1 |
| 12 | 50 | 10 | 10 | 30 | 5.17 | 3804.5 | 500.9 | 1501.3 |
| 13 | 30 | 50 | 10 | 10 | 5.10 | 3986.8 | 564.6 | 1626.7 |
| 14 | 40 | 40 | 10 | 10 | 5.17 | 4191.3 | 585.8 | 1672.5 |
| 15 | 70 | 10 | 10 | 10 | 5.33 | 4644.1 | 628.0 | 1761.6 |

As noted in Table 2, performances by each item of the refrigerant compositions having the above-described ratios are in the range between HFC-407C and HFC-410A, so that they can be used as a substitute refrigerant for HCFC-22.

Example 2

Performances of the refrigerant compositions comprising HFC-32/HFC-143a/HFC-134a/HFC-227ea having various mixed ratios were evaluated, and the results are as shown in Table 3.

TABLE 3

| Composition | HFC-32 (wt. %) | HFC-143a (wt. %) | HFC-134a (wt. %) | HFC-227ea (wt. %) | COP | VC (kJ/m$^3$) | P$_L$ (kPa) | P$_H$ (kPa) |
|---|---|---|---|---|---|---|---|---|
| 1 | 30 | 10 | 40 | 20 | 5.00 | 3520.8 | 476.5 | 1487.5 |
| 2 | 30 | 20 | 30 | 20 | 5.00 | 3706.0 | 511.4 | 1560.7 |
| 3 | 30 | 30 | 40 | 10 | 5.05 | 3828.3 | 533.1 | 15886 |
| 4 | 30 | 10 | 50 | 10 | 5.05 | 3484.1 | 465.2 | 1445.9 |
| 5 | 30 | 50 | 10 | 10 | 5.06 | 4191.2 | 609.2 | 1734.0 |
| 6 | 30 | 40 | 20 | 10 | 5.05 | 4007.5 | 570.0 | 1660.3 |
| 7 | 40 | 10 | 20 | 30 | 5.04 | 4039.3 | 558.2 | 1677.9 |
| 8 | 40 | 10 | 40 | 10 | 5.13 | 3883.4 | 523.0 | 1573.0 |
| 9 | 40 | 30 | 10 | 20 | 5.13 | 4350.4 | 619.1 | 1769.6 |
| 10 | 40 | 40 | 10 | 10 | 5.17 | 4444.6 | 636.6 | 1785.4 |
| 11 | 50 | 10 | 30 | 10 | 5.21 | 4269.7 | 580.0 | 1686.9 |
| 12 | 50 | 10 | 10 | 30 | 5.18 | 4513.8 | 630.7 | 1809.5 |
| 13 | 60 | 20 | 10 | 10 | 5.35 | 4855.6 | 677.8 | 1858.4 |
| 14 | 70 | 10 | 10 | 10 | 5.41 | 5014.0 | 691.9 | 1882.3 |

As noted in Table 3, performances by each item of the refrigerant compositions having the above-described ratios are in the range between HFC-407C and HFC-410A, so that they can be used as a substitute refrigerant for HCFC-22.

Example 3

Performances of the refrigerant compositions comprising HFC-32/HFC-143a/HFC-134a/HFC-236ea having various mixed ratios were evaluated, and the results are as shown in Table 4.

TABLE 4

| Composition | HFC-32 (wt. %) | HFC-143a (wt. %) | HFC-134a (wt. %) | HFC-236ea (wt. %) | COP | VC (kJ/m$^3$) | P$_L$ (kPa) | P$_H$ (kPa) |
|---|---|---|---|---|---|---|---|---|
| 1 | 40 | 10 | 40 | 10 | 5.01 | 3720.1 | 496.9 | 1542.1 |
| 2 | 40 | 20 | 30 | 10 | 5.02 | 3897.1 | 531.3 | 1610.7 |
| 3 | 40 | 30 | 20 | 10 | 5.04 | 4081.7 | 567.9 | 1679 |
| 4 | 40 | 40 | 10 | 10 | 5.07 | 4272.9 | 606.8 | 1748.1 |
| 5 | 50 | 10 | 30 | 10 | 5.10 | 4109.4 | 554.5 | 1657.2 |
| 6 | 50 | 20 | 20 | 10 | 5.14 | 4303.2 | 592.1 | 1724.8 |
| 7 | 50 | 30 | 10 | 10 | 5.17 | 4504.0 | 632.1 | 1792.9 |
| 8 | 60 | 10 | 20 | 10 | 5.22 | 4498.2 | 612.6 | 1761.0 |
| 9 | 60 | 20 | 10 | 10 | 5.27 | 4709.9 | 653.6 | 1828.3 |
| 10 | 70 | 10 | 10 | 10 | 5.35 | 4888.6 | 671.2 | 1855.4 |
| 11 | 50 | 10 | 35 | 5 | 5.16 | 4136.7 | 556.9 | 1647.6 |
| 12 | 55 | 20 | 17 | 8 | 5.21 | 4513.4 | 623.1 | 1774.4 |
| 13 | 60 | 10 | 15 | 15 | 5.13 | 4453.0 | 609.0 | 1776.5 |
| 14 | 45 | 33 | 10 | 12 | 5.08 | 4326.4 | 609.0 | 1761.7 |

As noted in Table 4, performances by each item of the refrigerant compositions having the above-described ratios are in the range between HFC-407C and HFC-410A, so that they can be used as a substitute refrigerant for HCFC-22.

Example 4

Performances of the refrigerant compositions comprising HFC-32/HFC-143a/HFC-134a/R-600 having various mixed ratios were evaluated, and the results are as shown in Table 5.

TABLE 5

| Composition | HFC-32 (wt. %) | HFC-143a (wt. %) | HFC-134a (wt. %) | R-600 (wt. %) | COP | VC (kJ/m$^3$) | $P_L$ (kPa) | $P_H$ (kPa) |
| --- | --- | --- | --- | --- | --- | --- | --- | --- |
| 1 | 40 | 10 | 40 | 10 | 5.00 | 3836.4 | 532.3 | 1599 |
| 2 | 40 | 20 | 30 | 10 | 5.01 | 3995.1 | 565.1 | 1663 |
| 3 | 40 | 30 | 20 | 10 | 5.02 | 4154.9 | 599.2 | 1726.9 |
| 4 | 40 | 40 | 10 | 10 | 5.03 | 4316.3 | 634.9 | 1791.2 |
| 5 | 50 | 10 | 30 | 10 | 5.09 | 4220.6 | 592.5 | 1719.6 |
| 6 | 50 | 20 | 20 | 10 | 5.11 | 4398.4 | 627.9 | 1782.6 |
| 7 | 50 | 30 | 10 | 10 | 5.13 | 4569.7 | 664.8 | 1846 |
| 8 | 60 | 10 | 20 | 10 | 5.20 | 4624.2 | 653.7 | 1829.7 |
| 9 | 60 | 20 | 10 | 10 | 5.23 | 4807.8 | 692.2 | 1892.7 |
| 10 | 70 | 10 | 10 | 10 | 5.33 | 5028.1 | 716.6 | 1931.7 |
| 11 | 55 | 20 | 20 | 5 | 5.25 | 4613.5 | 648.7 | 1806.5 |
| 12 | 70 | 10 | 7 | 13 | 5.09 | 4813.4 | 694.8 | 1937.3 |
| 13 | 60 | 20 | 13 | 7 | 5.30 | 4828.8 | 687.0 | 1872.7 |

As noted in Table 5, performances by each item of the refrigerant compositions having the above-described ratios are in the range between HFC-407C and HFC-410A, so that they can be used as a substitute refrigerant for HCFC-22.

What is claimed is:

1. A refrigerant composition comprising:

(a) a first constituent of difluoromethane, (b) a second constituent of 1,1,1-trifluoroethane, (c) a third constituent of 1,1,1,2-tetrafluoroethane, and (d) a fourth constituent butane, wherein the contents of the first, second, third and fourth constituents are in the ranges of 20–70 wt. %, 10–50 wt. %, 10–50 wt. % and 5–40 wt. %, respectively.

2. The refrigerant composition according to claim 1, wherein the content of the fourth constituent is in the range of 10–40 wt. %.

3. The refrigerant composition according to claim 1, wherein the content of the first constituent is in the range of 30–70 wt. % and the content of the fourth constituent is in the range of 10–30 wt. %.

4. The refrigerant composition according to claim 1, wherein the contents of the first, second, third and fourth constituents are in the ranges of 40–70 wt. %, 10–40 wt. %, 10–40 wt. % and 5–15 wt. %, respectively.

5. The refrigerant composition according to claim 1, wherein the content of the fourth constituent is in the range of 5–13 wt. %.

* * * * *